United States Patent [19]

Huelters

[11] 3,814,920

[45] June 4, 1974

[54] EMPLOYING VARIABLE CLOCK RATE

[75] Inventor: Hubert Huelters, Munich, Germany

[73] Assignee: Siemens Aktiengesellschaft, Berlin and Munich, Germany

[22] Filed: Feb. 15, 1972

[21] Appl. No.: 226,469

[30] Foreign Application Priority Data

Mar. 10, 1971 Germany ............................ 2111493

[52] U.S. Cl. .......................................... 235/153 AC
[51] Int. Cl. .......................................... G06f 11/04
[58] Field of Search ............... 235/153 AC, 153 AK; 340/172.5

[56] References Cited

UNITED STATES PATENTS

| | | | |
|---|---|---|---|
| 3,387,276 | 6/1968 | Reichow | 235/153 AK |
| 3,453,601 | 7/1969 | Bogert et al. | 235/152 X |
| 3,588,483 | 6/1971 | Lesniewski | 235/164 |
| 3,657,527 | 4/1972 | Kassubgi et al. | 235/153 AC |
| 3,673,397 | 6/1972 | Schaefer | 235/153 AC |

*Primary Examiner*—Malcolm A. Morrison
*Assistant Examiner*—David H. Malzahn
*Attorney, Agent, or Firm*—Hill, Gross, Simpson, Van Santen, Steadman, Chiara & Simpson

[57] ABSTRACT

A method and apparatus for fault diagnosis in pulse controlled devices whose control contains a logical network and a memory composed of a plurality of registers through the utilization of a data processing device wherein test apparatus is connected to the data processing device, the tested device internal timing pulse is switched off and replaced by a processing pulse supplied by the data processing device to form the basis on which the logical network of the test apparatus carries out a processing step, the contents of the test apparatus memory is transferred into the data processing device after each processing step carried out by the logical network of the test apparatus, the transferred information is compared with a standard in the data processing device in order to detect faults, and further wherein the contents of the memory registers can be changed by the data processing device before each processing step.

5 Claims, 4 Drawing Figures

EMPLOYING VARIABLE CLOCK RATE

DESCRIPTION

This invention relates to a method and apparatus for fault diagnosis in pulse controlled devices whose control contains a logical network and a memory composed of a plurality of individual registers, the method and apparatus being augmented with the help of a data processing device.

In order to keep the failure and maintenance times (down time) of pulse controlled devices, in particular peripheral devices associated with data processing apparatus, as small as possible, fault diagnosis has become important and will become increasingly important in the future. During fault diagnosis, it is desired to determine whether device controls operate without error, if possible through the utilization of a data processing device. Furthermore, it is desired that a fault be accurately located, also, if possible through the utilization of a fault search program.

It is an object of the invention to provide a method and apparatus for detecting faults in device control circuits, with the help of a data processing device, it being understood that such faults are presumed to be localized.

The method according to the invention for attaining the foregoing objective resides in connecting apparatus to be tested (hereinafter called the "test apparatus") to a data processing device, switching off the internal apparatus control pulse and replacing the same with a processing pulse from the data processing device to form the basis for which the logical network of the test apparatus carries out a processing step, transferring the contents of the test apparatus' register into the data processing device after each processing step has been carried out by the logical network of the test apparatus, and comparing the transferred information with a standard in order to detect faults. The method and apparatus further includes provisions for changing the content of the test apparatus register by the data processing device.

Advantageously, the registers of the test apparatus are connected to become a ring-shift register by means of a signal from the data processing device, and only a portion of the ring-shaft register is connected with the data processing device. The contents of the ring-shift register can be read into the data processing device by way of this portion and, on the other hand, the contents of the ring-shift register can be changed by the data processing device.

The arrangement for achieving the foregoing comprises a first device in the test apparatus which switches off the test apparatus internal control pulse, depending on a first control signal supplied by the data processing device, and which switches on a processing pulse from the data processing device; and a second device in the test apparatus which, depending on a second control pulse supplied by the data processing device, switches together the registers of the test apparatus to become a single ring-shift register, or again separates the ring-shift register into individual registers.

Certain reactions are caused in the device control by means of the processing pulses which are supplied by the data processing device to the test apparatus, and these reactions are reflected in the contents of the different registers. The contents of a register are transferred into the data processing device and compared with a standard which represents the correct information for the device control. From this comparison, the data processing device can determine whether the device control has correctly carried out a processing step.

The standard also represents a function pattern of the device control which is stored in the data processing device, for instance on a tape. An examination of the device during maintenance can be carried out as follows: The test apparatus is connected to the data processing device. Then, the data processing device operates the functions of the device control which are to be carried out, step by step, according to a program, and compares after each step (therefore after each processing pulse) the actual values which are determined at the test apparatus with the desired values of the standard which are stored on a tape. If a difference is detected, the corresponding information can be printed and the further evaluation which leads to the localization and elimination of the fault can be carried out by a technician. The localization of the fault, however, is advantageously detected by means of the data processing device with the aid of a program.

BRIEF DESCRIPTION OF THE DRAWINGS

The invention, its organization, construction and operation will be best understood from the following detailed description of preferred embodiments thereof taken in conjunction with the accompanying drawings, in which.

DESCRIPTION OF THE PREFERRED EMBODIMENTS

Figures 1, 2:
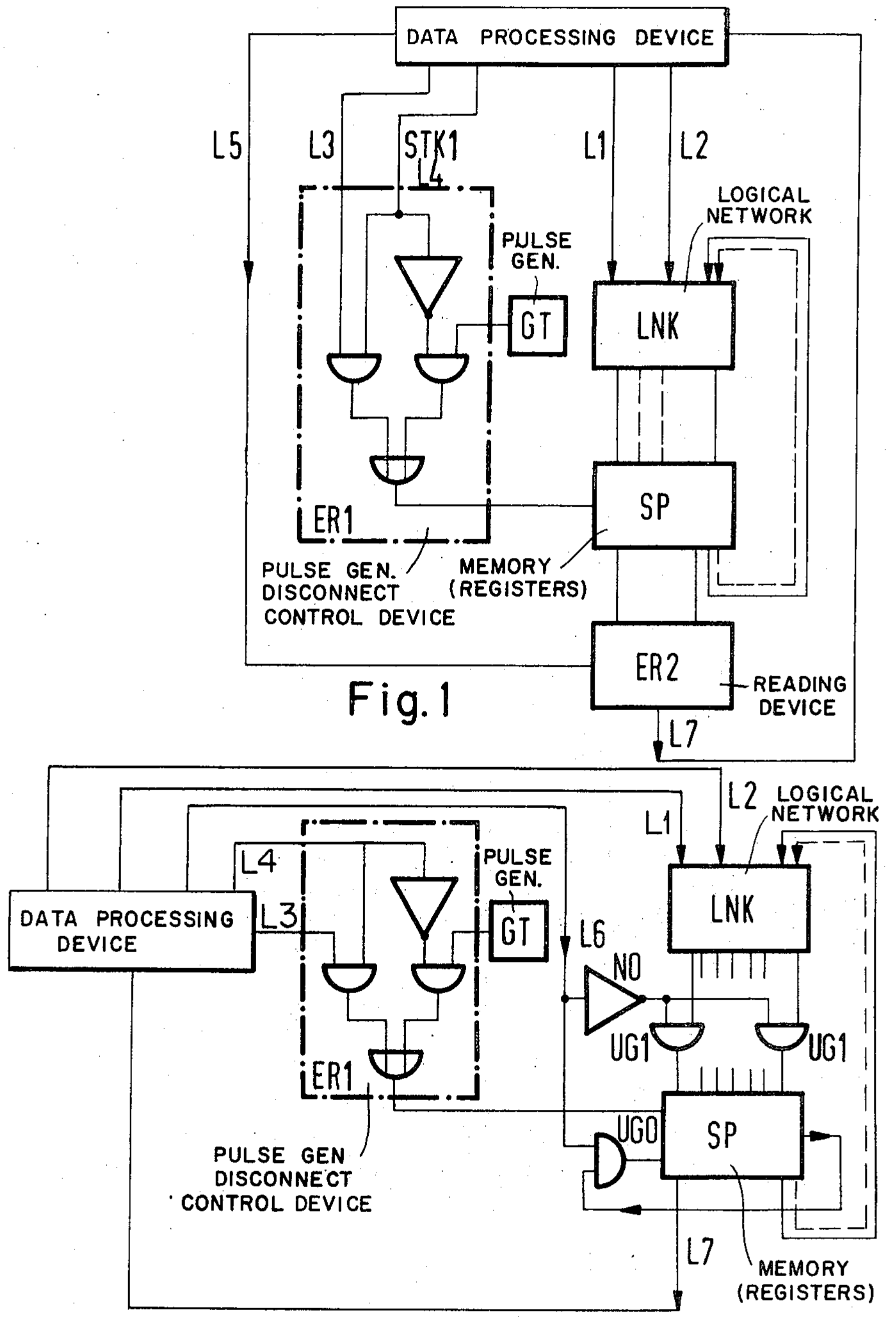
FIG. 1 is a logic diagram representation of a portion of a test apparatus device control according to the principles of the present invention.
FIG. 2 is a logic diagram of a portion of a test apparatus having a single ring-shift register according to the principles of the present invention.

Referring to FIG. 1, the portion of the test apparatus device control which is required for fault diagnosis has been illustrated. The device control of the test apparatus comprises a logical network LNK, registers which comprise a memory SP, and a device pulse generator GT which, during a normal operation of the tested apparatus, supplies the internal timing pulse.

The logical network LNK is connected with the registers of the memory SP and the registers are again connected to the logical network. The logical network LNK supplies the result on each processing step to the registers of the memory SP and obtains a part of the input magnitudes for the next processing step from the memory SP, and the other part of the input magnitudes (input signals) from external devices, for example from a data processing device, by way of the conductors L1, L2.

Two further devices are provided in the test apparatus for fault diagnosis. The first device has the task of switching off the internal pulse generator GT in the test mode, and to supply the processing pulse to the test apparatus. This device is referenced ER1. The device ER1 is supplied with the processing pulse by way of a line L3, and with a first control signal STK1 from the data processing device by way of a line L4. The first control signal STK1 states whether the device pulse generator GT is to be switched off or on. The second device, referenced ER2, primarily comprises a reading device in the sample embodiment of FIG. 1, with the help of which the information content of the registers of the memory SP can be read into the data processing device by way of a line L7. for reading the contents of the registers of the memory SP, the second device ER2 is supplied with a further control signal by way of the line L5.

During the testing process, the test apparatus is first of all connected to the data processing device. Then, the bistable stages of the registers are reset to a predetermined initial state. Then, the device pulse generator GT is switched off in response to receipt of the first control signal STK1 from the data processing device, by way of the first device ER1, and the processing pulse is connected to the test apparatus by way of the line L3. The first processing step is then carried out by the logical network LNK, which step is effected by way of a processing pulse from the data processing device. The result of the processing step is stored in the registers of the memory SP. The data processing device is able to read out the contents of the registers by way of a further control signal and the second device ER2, to store the information in the data processing device and compare the same with a standard. Then, the data processing device can supply new input magnitudes, if necessary, and supply the next processing pulse.

In order to decrease the number of connection lines between the test apparatus and the data processing device, the registers in the test apparatus can be connected to become a single ring-shift register by means of circuits under the control of a second control signal STK2 supplied from the data processing device. A corresponding embodiment is illustrated in FIG. 2. The components which were already illustrated in FIG. 1 are provided with the same reference numerals in FIG. 2. The first device ER1 can again switch off the device pulse generator GT and switch on the processing pulse. The second device ER2, however, now contains circuit arrangements in addition to the reading device and is operable to switch together the bistable stages of the memory SP to become a single ring-shift register and a circuit which can separate the logical network LNK from the registers.

If a second control signal STK2 is supplied by the data processing device at the line L6, the bistable stages of the memory are connected to become a ring-shift register, on the one hand, through the utilization of an AND circuit UGO and, on the other hand, the logical network LNK is separated from the registers with the help of an inverter NO and AND circuits UG1 which are inserted between the outputs of the logical network LNK and the inputs of the bistable stages of the memory. In this embodiment, the data processing device is not connected with all registers, but only with a certain number of the bistable stages. Therefore, the expense involved in testing the devices can be minimized.

The test apparatus may have further interfaces, for example with other devices, in addition to the interface where it is connected with the data processing device. In order to be able to completely examine the test apparatus, the programs must be simulated at such interfaces. For this purpose, all arriving and departing signal states are stored in registers. In addition, the signal lines of the interfaces which are directed toward the test apparatus are blocked in the test mode. The registers at the interfaces, like the remaining registers of the test apparatus, then form a part of the ring-shift register. Therefore, any desired information can be written into these registers and the information their contained can be determined at any time.

Figure 3:
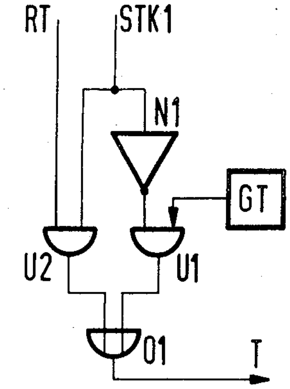
FIG. 3 is a logic circuit diagram of a first device which may be utilized in switching off the internal pulse generator of the test apparatus in the test mode for practicing the present invention.

In FIG. 3, a sample embodiment of the first device ER1 is illustrated. With the help of this first device ER1, the device pulse is switched off and the processing pulse RT is applied to the test apparatus. The first device ER1 comprises two AND circuits U1 and U2, and inverter N1 and an OR circuit O1. By means of applying the first control signal STK1 from the data processing device, the AND circuit U2 is opened so that the processing pulse RT can reach the output of the OR circuit O1 and thus the output of the device ER1 and form the pulse T. Simultaneously, the first AND circuit U1 is blocked by the first control signal STK1 which is inverted by the inverter N1 so that the device pulses supplied to the second input of the AND circuit U1 are switched off. During a normal operation of the test apparatus no control signal STK1 is provided so that the AND circuit U1 is open and the AND circuit U2 is blocked.

Figure 4:
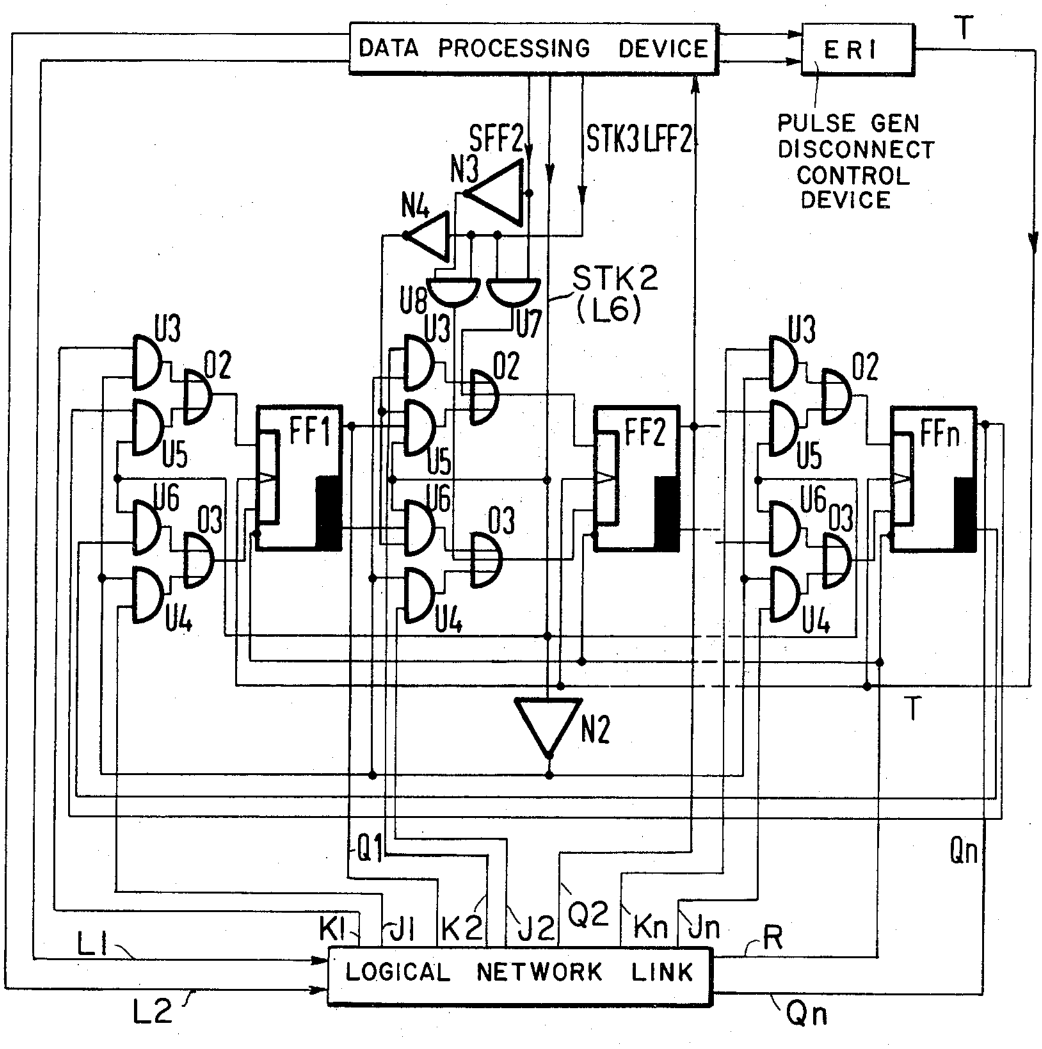
FIG. 4 is a logic circuit diagram of a second device which may be utilized for reading the information content of the registers into the data processing device in practicing the present invention.

A sample embodiment of the second device ER2 is illustrated in FIG. 4. Here, bistable stages FF1 through FFn of the registers are shown which can be interconnected to become a ring-shift register with the help of input circuits which are connected ahead of the bistable stages. Each input circuit, which is associated with a bistable stage FF, comprises AND circuits U3 through U6 and OR circuits O2, O3. The AND circuit U3 is supplied with a signal by way of the line K, for example from the logical network LNK, and the AND circuit U4 is supplied with a further signal by way of the line J, for example from the logical network LNK. The AND circuits U5, U6 are respectively connected with one of the outputs of the preceeding bistable stage. The second control signal STK2, which is supplied by the data processing device, is processed uninverted to the AND circuits U5 and U6 and, in negated form by way of the inverter N2 to the AND circuits U3 and U4. The outputs of the AND circuit U3 and U5 are connected to the OR circuit O2, and the outputs of the AND circuits U4 and U6 are connected to the OR circuit O3. The output of the OR circuit O2 is connected to one of the inputs of the associated bistable stage, and the output of the OR circuit O3 is connected to another input of the associated bistable stage. Furthermore, a pulse T is supplied to the bistable stages FF, which is the processing pulse RT supplied by the data processing device via the device ER1 in the test mode.

The second device ER2 further contains a write circuit. With the help of the write circuit information can be written into certain bistable stages. The write circuit comprises AND circuits U7 and U8 and inverter circuits N3 and N4. In FIG. 4, only one of these write circuits has been illustrated, the circuit associated with the bistable stage FF2. The number of write circuits, of course, corresponds to the number of bistable stages to which the data processing device has access. The AND circuit U7 is supplied with the uninverted write signal SFF2, and the AND circuit U8 is supplied with the negated form of the same signal. A further control signal STK3 is respectively applied to the other input of the AND circuit U7 and the AND circuit U8 and, on the other hand, to the inputs of the AND circuits U5, U6 of the input circuits of the bistable stages by way of the inverter N4. The output of the AND circuit U7 is connected to the OR circuit O2 of the input circuit, and the output of the AND circuit U8 is connected with the input of the OR circuit O3 of the input circuit.

Until such time as the second control signal STK2 is provided, the AND circuits U5 and U6 of the input circuit are blocked, and the bistable stages FF of the memory are not coupled to each other. At the same time, since the control signal STK2 is inverted by the inverter N2, the AND circuits U3 and U4 are opened so that the signals applied to the conductors J and K are supplied to the bistable stages FF. The circuit is in this state when the test apparatus is not in the test mode. If a control signal STK2 is provided, the AND circuits U5, U6 are open and therefore the bistable stages FF and the AND circuits U5, U6 and the OR circuits O2, O3 are connected with each other to form a ring-shift register. Since the control signal STK2 is inverted by the inverter N2, the AND circuits U3, U4 are blocked so that the bistable stages can not be influenced by signals applied to the conductors J and K.

If the bistable stage associated with the right circuit is to be written into, the data processing device applies a third control signal STK3 which opens the AND circuits U7, U8. The write signals SFF2 are then applied uninverted to the OR circuit O2 of the input circuit and, in negated form by way of the inverter N3 to the OR circuit O3 of the input circuit. The state of the assigned bistable stages FF is therefore changed accordingly. However, the AND circuits U5 and U6 are simultaneously blocked by the control signal STK3 as inverted by the inverter N4 so that the contents of this preceeding bistable stage can not reach the bistable stage FF into which information is to be written from the data processing device. The information which, for example, is written into the bistable stage FF2 can be shifted further with the help of a shift pulse, so that the entire ring-shift register can be supplied with new information by the data processing device in this manner. If the entire information in the ring-shift register is to be written into the data processing device, the information is shifted in the ring-shift register through the application of the shift pulse T until the entire information content of the ring-shift register has reached the bistable stages which are connected with the data processing device.

The outputs of the bistable stages FF which lead to the logical network LNK are denoted by Q(Q1–Qn). The conductor LFF2 is provided for reading the information into the data processing device. Since the registers are separated from the logical network LNK during the time when they are connected as a ring-shift register, the processing pulses can be applied in a first instance as data processing pulses for the logical network and, in other instances as time shift pulses for the ring shift register.

The operation of the test apparatus in the test mode is as follows: First of all, the test apparatus is connected to the data processing device. Then the registers of the test apparatus are set to a predetermined state. The first device ER1 is activated by the first control signal STK1 (step 1), i.e. the device pulse is switched off and the processing pulse RT is supplied to the test apparatus.

Then, the second device ER2 is switched on by the second control signal STK2 (step 2), i.e. the registers are interconnected to become a ring-shift register.

The selection to read is made by way of the third control signal STK3 and, correspondingly, the entire information of the ring-shift register is read into the data processing device via the line LFF2 (step 3), while timed by the processing pulse.

The information can then be evaluated in the data processing device. The second device ER2 is switched off again by the second control signal STK2, and therefore the ring-shift register is separated and the logical network of the test apparatus is connected to the bistable stages of the memory SP (step 4). Now, the data processing device, initiated by the first control signal STK1, supplies the test apparatus with a pulse which, since the second device ER2 is switched off, has the effect of a processing pulse (step 5). The information in the bistable stages of the memory after the first processing pulse has been utilized is read into the data processing device by means of repeating the steps hereinbefore set forth. Following this, the next processing pulse is applied.

If external or other interfaces must be simulated, the bistable stages which are associated with these interfaces are correspondingly charged with information, between steps 3 and 4.

The method and apparatus of the present invention provides means by which the cost for the circuits which must be inserted in the test apparatus is held to a minimum amount. The device ER1 merely consists of a few logical components. For the device ER2 the write circuit and the input circuits of the bistable stages for incorporating the bistable stages into a ring-shift register and for switching off the logical network are required. If the registers are initially constructed as shift registers, the cost for realizing the second device ER2 is lowered even further. Therefore, it is a particular advantage of the invention that devices can be tested with the help of a data processing device without great additional expense.

Although I have described my invention by reference to specific illustrative embodiments thereof, many changes and modifications may become apparent to those skilled in the art without departing from the spirit and scope of the invention, and it is to be understood that I intend to include within the scope of the patent warranted hereon all such changed and modifications as may reasonably and properly be included within the scope of my contribution to the art.

I claim:

1. An arrangement for diagnosing faults of a pulse-controlled device having a logical network for processing device data, a register having a plurality of stages and connected to said logical network, and a pulse generator for generating device control pulses connectable to said register, comprising: a data processing device for receiving device data including means for comparing the data with a standard, means for correcting erroneous data connected to said register and means connected to said pulse-controlled device for generating processing pulses and a plurality of control pulses; a first device connected between said data processing device and said pulse generator and said register for receiving processing pulses and a first of said control pulses and responsive thereto to disconnect said pulse generator from and connect the processing pulses to said register; and a second device connected between said register and said data processing device and operable in response to a second of said control signals to control the connection of said register stages as a ring-shift register.

2. The arrangement of claim 1, wherein said first device comprises a first AND circuit connected to said pulse generator, an inverter for receiving said first control signal connected to said first AND circuit, a second AND circuit connected to receive said processing pulses and said first control signal, and an OR circuit connected between said first and second AND circuits and said register.

3. The arrangement of claim 1, wherein said second device comprises a plurality of input circuits respectively connected to the stages of said register and operable in response to said second control signal to connect the associated stage with another stage to form a ring-shift register and disconnect the stages from said logical network, and a write circuit connected to a portion of said register stages and operable to write information in that portion of the register in response to a third of said control signals.

4. The arrangement of claim 3, wherein each of said register stages is a bistable circuit having a plurality of inputs ane outputs and each of said input circuits comprises a third and fourth AND circuits connected to receive data signals from said logical network, a second inverter connected to said third and fourth AND circuits for receiving and passing inverted thereto the second control signal, fifth and sixth AND circuits connected to receive said second control signal and connected to respective outputs of a preceeding bistable circuit, second and third OR circuits connected to said third and fifth AND circuits and to said fourth and sixth AND circuits, respectively, and to respective inputs of the associated bistable stage.

5. The arrangement of claim 4, wherein said write circuit comprises a pair of AND circuits each connected to receive said third control signal and respectively connected to said second and third OR circuits, a third inverter, one of said AND circuits connected to receive a write control signal from said data processing device and the other of said AND circuits connected to receive the inverted write control signal via said third inverter, and a fourth inverter connected to receive said third control signal and provide the inverted form thereof to said fifth and sixth AND circuits.

* * * * *